US007926155B2

(12) United States Patent
Grossmann (10) Patent No.: US 7,926,155 B2
(45) Date of Patent: Apr. 19, 2011

(54) MACHINE TOOL

(75) Inventor: Walter Grossmann, Baltmannsweiler (DE)

(73) Assignee: Index-Werke GmbH & Co. KG Hahn & Tessky (DE)

( * ) Notice: Subject to any disclaimer, the term of this patent is extended or adjusted under 35 U.S.C. 154(b) by 0 days.

(21) Appl. No.: 12/324,041

(22) Filed: Nov. 26, 2008

(65) Prior Publication Data

US 2009/0082184 A1 Mar. 26, 2009

Related U.S. Application Data

(63) Continuation of application No. PCT/EP2007/004299, filed on May 15, 2007.

(30) Foreign Application Priority Data

May 30, 2006 (DE) .......................... 10 2006 026 186

(51) Int. Cl.
*B23P 23/00* (2006.01)
*B23B 29/32* (2006.01)

(52) U.S. Cl. .................. 29/27 C; 29/40; 82/121; 82/129

(58) Field of Classification Search .................. 29/27 C, 29/27 R, 39–40, 36, 33 J; 82/120–121, 129, 82/159; 74/826, 813 R, 813 L; 408/35
See application file for complete search history.

(56) References Cited

U.S. PATENT DOCUMENTS

| 3,786,539 A | 1/1974 | Foll et al. |
| 4,953,274 A * | 9/1990 | Rehage et al. ................. 29/27 C |
| 5,885,199 A | 3/1999 | Shao |

FOREIGN PATENT DOCUMENTS

| DE | 1 952 050 | | 4/1971 |
| DE | 31 46 429 A1 | | 6/1983 |
| DE | 195 28 404 A1 | | 2/1997 |
| DE | 102 13 778 A1 | | 10/2003 |
| EP | 0 538 515 A1 | | 4/1993 |
| EP | 1 452 269 A1 | | 9/2004 |
| JP | 05-038607 A | * | 2/1993 |

OTHER PUBLICATIONS

Machine Translation of DE 19528404, which document was published on Feb. 6, 1997.*
Machine Translation of JP 05-038607, which document was published in Feb. 1993.*

* cited by examiner

*Primary Examiner* — Erica E Cadugan
(74) *Attorney, Agent, or Firm* — Reinhart Boerner Van Deuren P.C.

(57) ABSTRACT

A machine tool having a machine frame. A first workpiece carrier unit is disposed on the machine frame and has a workpiece receiving mechanism. At least one tool carrier unit is disposed on the machine frame, on which at least one tool for machining a workpiece held in the workpiece receiving mechanism is disposed. In an embodiment, there is a working space, in which a workpiece, held in the workpiece receiving means, can be machined with the tool. In an embodiment, the tool carrier unit has a tool carrier base and a tool carrier head, which is movable in relation to the tool carrier base along an axis of advance via a guiding arm. The tool carrier head is rotatable about an axis of rotation coincident or parallel to the axis of advance, by the tool carrier head being fixedly connected to the guiding arm and by the tool carrier head being formed as a multiple tool carrier which has at least two tool planes, in which at least one respective tool extends in at least one of its tool directions.

38 Claims, 10 Drawing Sheets

MACHINE TOOL

CROSS-REFERENCE TO RELATED PATENT APPLICATIONS

This application is a continuation of International application No. PCT/EP2007/004299 filed on May 15, 2007.

This patent application claims the benefit of International application No. PCT/EP2007/004299 of May 15, 2007, and German application No. 10 2006 026 186.0 of May 30, 2006, the teachings and disclosure of which are hereby incorporated in their entirety by reference thereto.

BACKGROUND OF THE INVENTION

The invention relates to a machine tool comprising a machine frame, a first workpiece carrier unit, which is disposed on the machine frame and has a workpiece receiving means, at least one tool carrier unit, which is disposed on the machine frame and on which at least one tool for machining a workpiece held in the workpiece receiving means is disposed, and a working space, in which a workpiece held in the workpiece receiving means can be machined with the tool.

Such machine tools are known from the prior art.

With these machine tools there is always the problem that, on the one hand, the number of tools that can be used should be as great as possible and, on the other hand, the space required for using the tools available should be kept as small as possible.

SUMMARY OF THE INVENTION

This object is achieved according to the invention in the case of a machine tool of the type described at the beginning by the tool carrier unit having a tool carrier base and a tool carrier head, which is movable in relation to the tool carrier base along an axis of advance by means of a guiding arm and is rotatable about an axis of rotation parallel to the axis of advance, by the tool carrier head being fixedly connected to the guiding arm and by the tool carrier head being formed as a multiple tool carrier which has at least two tool planes, in which at least one respective tool extends with at least one of its tool directions.

A tool direction is to be understood here as meaning the direction of the tool that is determined by an advancing and/or feeding direction of the tool or corresponds thereto.

The advantage of the solution according to the invention can be seen in that it creates a simple possible way of providing a tool carrier head with a plurality of tools in the most space-saving and uncomplicated manner possible, while ensuring that the tools can be optimally used on account of the advantageous way in which they are spatially disposed.

The tools are disposed particularly advantageously if the at least two tool planes run parallel to the axis of rotation, so that as a result the tools are available in a geometrically simple relation to the tool carrier unit when the tool carrier head is turned.

A particularly simple solution provides that the tool planes run parallel to the axis of rotation, so that the alignment of the tool directions does not change when the tool carrier head is turned about the axis of rotation.

A particularly suitable disposition of the tool planes is provided by the at least two tool planes of the tool carrier head running through a common straight line.

In particular in the cases in which the tool carrier head has more than two tool planes, a particularly suitable solution provides that all the tool planes of the tool carrier head run through the straight line.

A particularly advantageous solution provides that the common straight line lies within a geometric cylindrical space around the axis of rotation, which has a radius corresponding to an average radius of the guiding arm.

The advantage of this solution can be seen in that the disposition of the straight line in the cylindrical space near the axis of rotation creates the possibility that, during the machining of a workpiece, the forces occurring in the tool direction as a result of moving a tool disposed in one of the tool planes act with the smallest possible moments on the guiding arm, and the latter is consequently able to accept these forces with little torsion, still better with substantially no torsion.

It is particularly advantageous here if the cylindrical space has a radius corresponding to 0.5 of the average radius of the guiding arm.

It is still better if the cylindrical space has a radius corresponding to 0.2 of the average radius of the guiding arm.

This solution is particularly advantageous if the common straight line coincides with the axis of rotation. This solution also has the advantage that substantially no torques act on the guiding arm during use of the tools inserted in the tool carrier head.

With regard to the tools to be disposed, details have only been specified in connection with the description so far of the solution according to the invention to the extent that at least one tool per tool plane is provided.

It is particularly advantageous if a number of tools extend with their tool directions in at least one of the tool planes, said directions being determined by advance and/or feed directions of the tools, in particular corresponding to these directions.

A particularly advantageous concept provides that, in at least two of the tool planes, a number of tools are disposed so as to extend in these planes with their tool direction.

The disposition of the multiple tools disposed in one tool plane has not been specified in any further detail. A particularly advantageous solution provides that the plurality of tools that extend with their tool direction in the respective tool plane are disposed in a linear tool carrier of the tool carrier head.

With regard to the alignment of the linear tool carrier, no further details have been specified. It is particularly advantageous if the linear tool carrier has tool receiving means lined up in the direction of a row that is parallel to the direction of advance of the tool carrier head relative to the tool carrier base, the tools being insertable into these tool receiving means.

However, it is also conceivable within the scope of the solution according to the invention to provide in one of the tool planes a tool that is disposed in a tool spindle and extends with its tool axis in the tool plane.

Such a tool can be realized in a simple way as a driven tool.

It is preferably provided here that the tool axis is aligned transversely to the axis of rotation, since this is a simple way of providing the possibility of optimally machining with such a tool. In particular, it is provided that the tool axis runs perpendicularly to the axis of rotation.

With regard to the alignment of the tool planes, no further details have been specified so far. So, for example, any number of tool planes could be provided.

A particularly advantageous solution provides that successive tool planes, that is to say tool planes that follow one another in a circumferential direction around the straight line in which said planes intersect, form an included angle which is greater than 90° and less than 180°.

It is still better if the angle is greater than 100° and less than 170° and, furthermore, a solution in which the angle is greater than 110° and less than 160° is more advantageous.

A particularly advantageous solution provides that the angle between successive tool planes is approximately 120°.

As an alternative or in addition to the embodiment described so far, a further embodiment of the solution according to the invention provides that the tool carrier unit has a tool carrier base and a tool carrier head, which is movable in relation to the tool carrier base along an axis of advance by means of a guiding arm and is rotatable about an axis of rotation parallel to the axis of advance, by the tool carrier head being fixedly connected to the guiding arm, by the tool carrier head comprising a tool spindle and by a tool spindle housing of the tool carrier head having a supplementary tool carrier.

The advantage of this solution can be seen in that are there is, on the one hand, the possibility of providing a tool spindle for milling operations and, on the other hand, also the possibility of providing additional tools by means of the supplementary tool carriers.

Such a supplementary tool carrier could in principle be disposed anywhere on the tool spindle housing.

For example, it would be conceivable to dispose the supplementary tool carrier on the tool spindle housing on a side opposite from the tool receiving means.

However, a particularly advantageous solution provides that the supplementary tool carrier is disposed on the tool spindle housing on at least one side of the tool spindle axis.

A further suitable solution provides that the tool spindle housing carries a supplementary tool carrier on more than one side, so that there is the possibility of using a number of such supplementary tool carriers and consequently increasing still further the number of tools that can be used.

It is particularly advantageous for use of the tools of the supplementary tool carrier if the tool spindle housing carries a supplementary tool carrier on mutually opposite sides.

In particular with regard to the rotatability of the tool spindle housing about the axis of rotation, it is advantageous if the supplementary tool carriers are disposed on the tool spindle housing on mutually opposite sides of the axis of rotation, since they can then be brought into use by simple turning of the tool spindle housing about the axis of rotation.

In order to be able to increase further the number of tools that can be used, it is suitably provided that the supplementary tool carrier is formed as a multiple tool carrier.

Such a multiple tool carrier could, for example, have tools disposed in a two-dimensional area.

However, it is particularly suitable if the multiple tool carrier is formed as a linear tool carrier, since such a linear tool carrier has spatially suitable conditions for disposing the multiple tools while at the same time causing little disturbance of the other tools during the use of one of the tools on the workpiece.

Such a linear tool carrier may be disposed on the tool spindle housing in a wide variety of ways.

For example, it would be conceivable to align the linear tool carrier parallel to a tool spindle axis.

However, it is particularly suitable if the linear tool carrier has tool receiving means disposed in the direction of a row parallel to the direction of advance of the tool spindle, the direction of advance being the direction along which movement of the tool spindle housing takes place relative to the tool carrier base.

Such tool receiving means are usually tool holder receiving means, in which tool holders carrying tools can be inserted. However, it is also conceivable to form the tool receiving means in such a way that tools, such as drilling tools for example, can be inserted into them directly.

In order to create particularly advantageous spatial possibilities for using the tools, it is preferably provided that all the tool receiving means of the linear tool carrier lie in one tool plane.

With regard to the disposition of the tool spindle housing on the guiding arm, no further details have been specified so far. So, an advantageous solution provides that the tool spindle housing is fixedly connected to a front end of the guiding arm.

The tool spindle may be formed and disposed in relation to the axis of rotation of the tool carrier head in a wide variety of ways. An advantageous solution provides that the tool spindle has a tool spindle axis aligned transversely to the axis of rotation.

It is particularly advantageous if the tool spindle is formed in such a way that it has a tool spindle axis aligned transversely to the direction of advance of the tool carrier head in relation to the tool carrier base.

Furthermore, a spindle shaft mounted in the tool spindle housing could, for example, be provided with a tool receiving means at both ends. However, it is more advantageously provided that the spindle shaft mounted in the tool spindle housing is provided with a tool receiving means at one end.

Furthermore, the tool receiving means is preferably disposed on the spindle shaft in such a way that it is disposed in relation to the axis of rotation of the tool carrier head on one side of the same.

As an alternative or in addition to the embodiment described above, a further advantageous solution provides that the tool carrier unit has a tool carrier base and a tool carrier head, which is movable in relation to the tool carrier base along an axis of advance by means of a guiding arm and is rotatable about an axis of rotation parallel to the axis of advance, that the tool carrier head is fixedly connected to the guiding arm and that the tool carrier head is formed as a multiple linear tool carrier which comprises linear tool carriers that are disposed in a star shape around the axis of rotation and have tool receiving means disposed in the direction of a row parallel to the direction of advance of the multiple linear tool carrier in relation to the tool carrier base.

Such multiple linear tool carriers have the advantage that a multiplicity of tools can be used in geometrically advantageous alignment with one another.

It is preferably provided here that all the tool receiving means of each of the linear tool carriers lie in one tool plane.

The type of workpiece carrier unit has not been specified in any further detail in connection with the description so far of the solution according to the invention.

For example, such a workpiece carrier unit could be a turntable on which a workpiece can be positioned.

All kinds of workpiece carriers known from machining centers could be alternative solutions for such a workpiece carrier unit.

An advantageous solution for a workpiece carrier unit according to the invention provides that the workpiece carrier unit is formed as a workpiece spindle unit in which a workpiece can be rotationally driven for machining by turning and in which a workpiece can likewise be rotated, or positioned in different rotational positions, within the limits of a C axis of the workpiece spindle unit for the advance movement.

Furthermore, the machining of a workpiece in such a workpiece carrier unit of the machine tool requires a further relative movement of the workpiece carrier unit in relation to the tool carrier unit in an X direction of the machine tool.

Such freedom of movement of the workpiece carrier unit in relation to the tool carrier unit in the X direction can be realized, for example, by the workpiece carrier unit being movable in relation to the tool carrier unit in the X direction.

As an alternative to this, however, it is also conceivable to move the tool carrier unit in relation to the workpiece carrier unit in the X direction.

Furthermore, the machining of the workpiece in such a workpiece carrier unit generally requires a further relative movement between the workpiece carrier unit and the tool carrier unit.

Such a relative movement can also be realized either by a relative movement of the workpiece carrier unit in relation to the tool carrier unit or a relative movement of the tool carrier unit in relation to the workpiece carrier unit in the Z direction.

No further details have been given in connection with the explanation so far of the individual exemplary embodiments as to how the movement of the guiding arm in relation to the tool carrier base is intended to take place.

So, an advantageous solution provides that a drive unit is provided on the tool carrier base for the movement of the guiding arm in relation to the tool carrier base.

This drive unit is formed in particular in such a way that it comprises a rotary drive, the rotor of which is connected to the guiding arm and the stator of which is rotationally fixed in a housing of the drive unit. This represents a simple way of providing the possibility of turning the guiding arm about its longitudinal axis and consequently performing a rotational movement of the tool turret as a whole that is seated on the guiding arm.

Furthermore, it is preferably provided that the stator of the rotary drive is displaceable in relation to the housing of the drive unit by means of a linear drive.

This also provides the possibility of displacing the guiding arm in the direction of its longitudinal axis, and consequently in the direction of advance, by displacement of the stator and of the rotor that is coupled to the stator in an axially non-displaceable manner.

For example, such a linear drive is formed as a spindle drive.

With regard to the disposition of the housing of the drive unit, no further details have been specified so far.

So, for example, the housing is suitably connected to the tool carrier base.

In particular, a suitable solution provides that the housing of the drive unit is fixedly connected to the rotary/longitudinal guide of the tool carrier base for the guiding arm.

Further features and advantages of the invention are the subject of the following description and the pictorial representation of a number of exemplary embodiments.

DETAILED DESCRIPTION OF THE INVENTION

Figure 1:
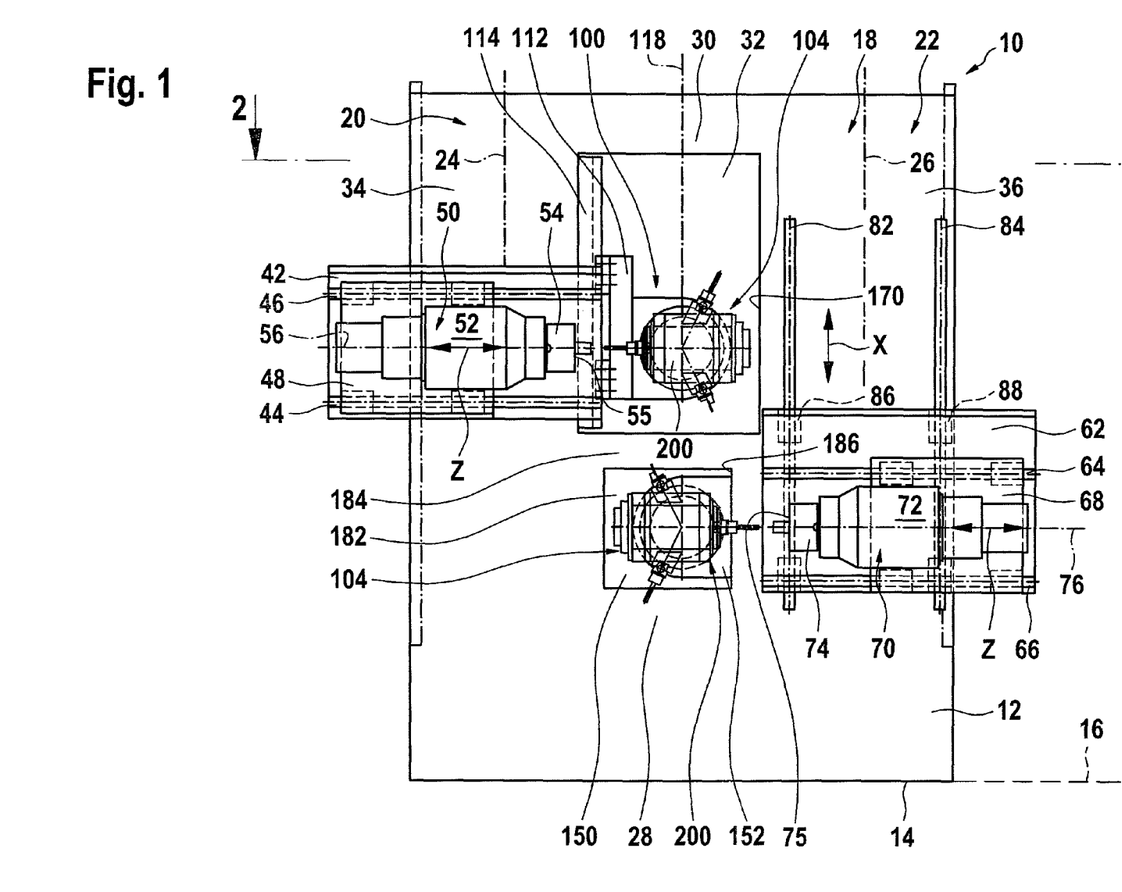
FIG. 1 shows a schematic front view of a first exemplary embodiment of a machine tool according to the invention.

A first exemplary embodiment of a machine tool according to the invention, in particular a turning center, comprises a machine frame, which is designated as a whole by 10 and has a frame base 12, which rests with its underside 14 on a standing area 16, and a machine bed 18, which rises up above the frame base 12 and comprises a first column 20 and a second column 22, which are spaced apart and extend away from the frame base 12 with longitudinal axes 24, 26 running approximately parallel to one another, the longitudinal axes 24, 26 preferably running transversely to the standing area 16, preferably perpendicularly thereto.

The two columns 20, 22 could in principle rise up above the frame base 12 independently of one another. However, a more stable construction of the machine bed 18 is one in which the two columns 20, 22 are connected to one another by a first cross bracing 28 and a second cross bracing 30.

Furthermore, the two columns 20, 22 are spaced apart in such a way that between them there is a sufficiently large opening 32, which in the case of the cross bracings 28, 30 is enclosed on all sides by the machine bed, so that the machine bed 18 is formed overall in the manner of a yoke and consequently surrounds the opening 32 in a closed yoke-like manner.

Furthermore, the first column 20 has a first front side 34 and the second column 22 has a second front side 36, which are facing a working space 40, which is disposed on one side of the machine bed 18 and lies in front of the two front sides 34, 36 and in front of the opening 32 and extends in front of the machine bed 18 transversely to the longitudinal axes 24, 26 and in a direction parallel to the longitudinal axes 26.

Figure 2:
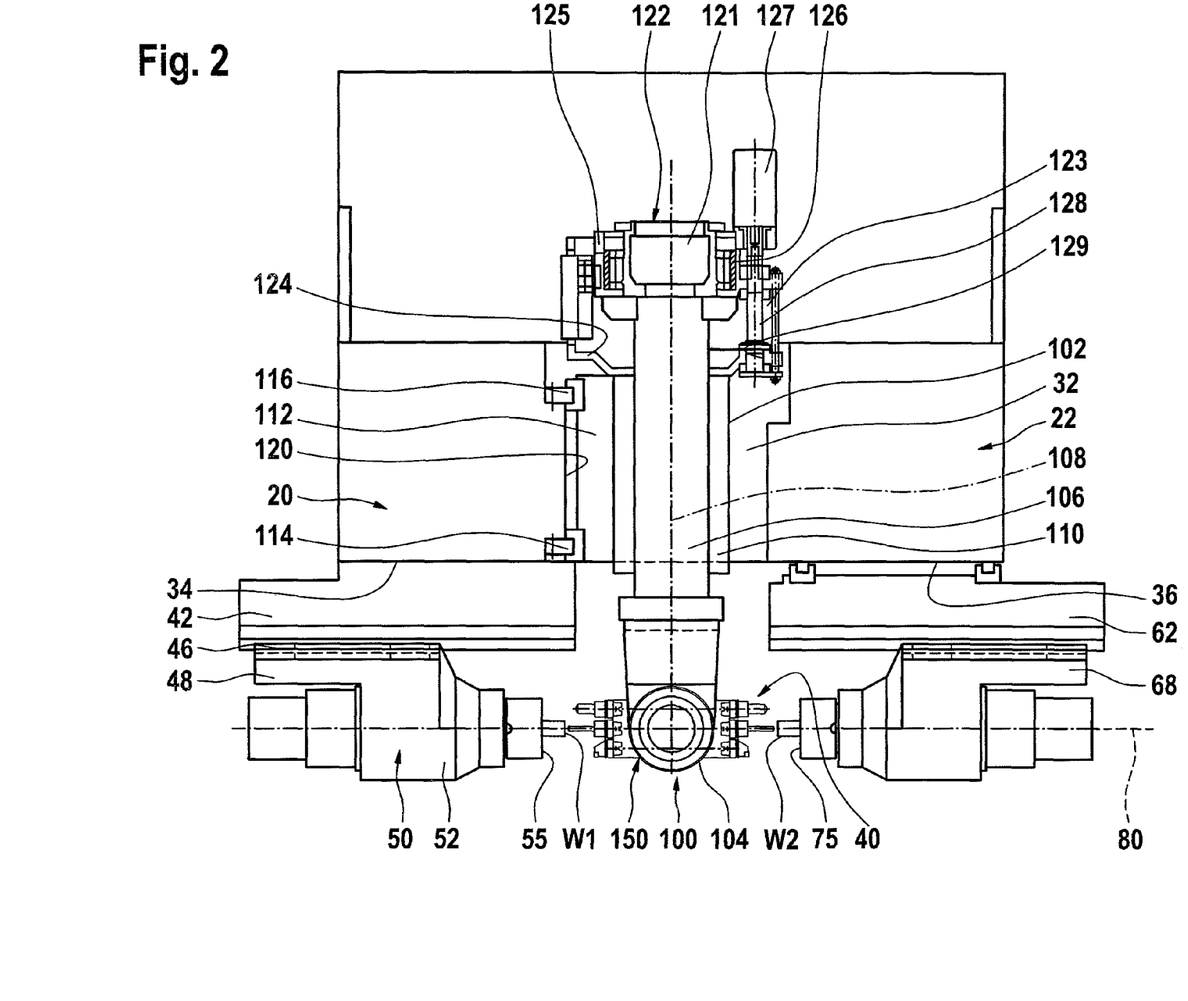
FIG. 2 shows a section along line 2-2 in FIG. 1.

As further represented in FIGS. 1 and 2, disposed on the first front side 34 is a base body 42 with slide guides 44, 46, which run parallel to one another, extend transversely to the longitudinal axis 24 of the first column 20 and on which a spindle slide 48 is guided, on which slide a first workpiece spindle unit designated as a whole by 50 is disposed, this unit comprising a first workpiece spindle housing 52 in which a first workpiece spindle 54 is mounted rotatably about a first workpiece spindle axis 56.

The workpiece spindle axis 56 preferably runs parallel to the slide guides 44, 46 and also substantially in a horizontal direction.

The slide guides 44, 46 seated on the base body 42 consequently have the effect that the first workpiece spindle unit 50 is movable in a direction parallel to the first workpiece spindle axis 56, and consequently in a so-called Z direction in relation to the first column 20.

Likewise provided on the second front side 36 of the second column 22 is a base body 62, on which there are disposed slide guides 64, 66 that likewise run transversely to the longitudinal axis 26 and on which guides a spindle slide 68 is movably mounted.

The spindle slide 68 also carries a second workpiece spindle unit 70 with a second workpiece spindle housing 72, in which a second workpiece spindle 74 is mounted rotatably about a second workpiece spindle axis 76.

In particular, the first workpiece spindle axis 56 and the second workpiece spindle axis 76 lie in a spindle guiding plane which is designated as a whole by 80 and preferably runs parallel to the front sides 34 and 36 and at a distance from them.

In principle, it would be conceivable to dispose the base body 62 on the front side 36 in a stationary manner, to be precise in such a way that the first and second workpiece spindle axes 56 and 76 are in line with one another.

In the case of the first exemplary embodiment, as represented in FIGS. 1 and 2, provided on the front side 36 are slide guides 82, 84, on which the base body 62 is guided by guiding bodies 86, 88, the slide guides 82, 84 preferably running approximately parallel to the longitudinal axis 26 of the column 22.

Consequently, the second workpiece spindle unit 70 is movable on the one hand likewise in the Z direction by the spindle slide 68 and on the other hand also in a so-called X direction, which runs perpendicularly to the spindle axes 56 and 76, by travel of the base body 62 on the slide guides 82 and 84 relative to the second column 22.

The first workpiece spindle 54 and the second workpiece spindle 74 are formed in such a way that a workpiece clamping device 55, 75 is provided on the side facing the respective other workpiece spindle 74 or 54, by which device a first workpiece W1 can be fixed in the first workpiece spindle 54 and a second workpiece W2 can be fixed in the second workpiece spindle 74 and, for machining the same, can be rotated about the respective workpiece spindle axis 56 or 76.

As represented in FIGS. 1 and 2, the turning center according to the invention is provided with a tool carrier unit, which is designated as a whole by 100 and has a tool carrier base 102, extending partially in the opening 32, and a tool carrier head 104, disposed in the working space 40.

The tool carrier head 104 is seated here on a guiding arm 106, which is mounted in the tool carrier base 102 displaceably in relation to the tool carrier base 102 in the direction of a longitudinal axis 108 of the guiding arm 106 and is also rotatable in the tool carrier base 102, about the longitudinal axis 108 of the guiding arm 106.

For this purpose, the guiding arm 106 is preferably guided in a longitudinal and rotary guide 110 of the tool carrier base 102.

The longitudinal and rotary guide 110 of the tool carrier base 102 is seated here on a tool carrier slide 112, which for its part is guided on slide guides 114, 116.

The slide guides 114, 116 are seated on a first transverse side 120 of the first column 20, which is facing the opening 32 and the opposite second column 22.

The slide guides 114, 116 preferably extend here parallel to the longitudinal axis 24 of the first column 20, so that the tool carrier slide 112 is movable in the opening 32 along the first column 20, preferably in the X direction.

There is consequently the possibility of feeding a tool WZ1 that is held in the tool carrier head 104 in the X direction in the direction of the workpiece W1 that is held in the first workpiece spindle 54.

Furthermore, the longitudinal and rotary guide 110 for the guiding arm 106 is disposed on the tool carrier slide 112 in such a way that, as represented in particular in FIG. 2, the longitudinal axis 108 of the guiding arm 106 runs transversely to the slide guides 114, 116, and consequently also transversely to the spindle guiding plane 80. The longitudinal axis 108 preferably runs perpendicularly to the spindle guiding plane 80.

Consequently, the tool carrier head 104 is movable not only by moving the tool carrier slide 112 in the X direction in relation to the workpiece W1, but also movable transversely to the X direction in the direction of the longitudinal axis 108, and consequently in a Y direction, as well as rotatable about the longitudinal axis 108, that is to say about a so-called B axis.

Overall, the tool carrier head 104 is consequently movable in a tool guiding plane 118, which runs parallel to the X direction and parallel to the Y direction, the tool guiding plane 118 running transversely, preferably perpendicularly, to the spindle guiding plane 18.

Figure 3:
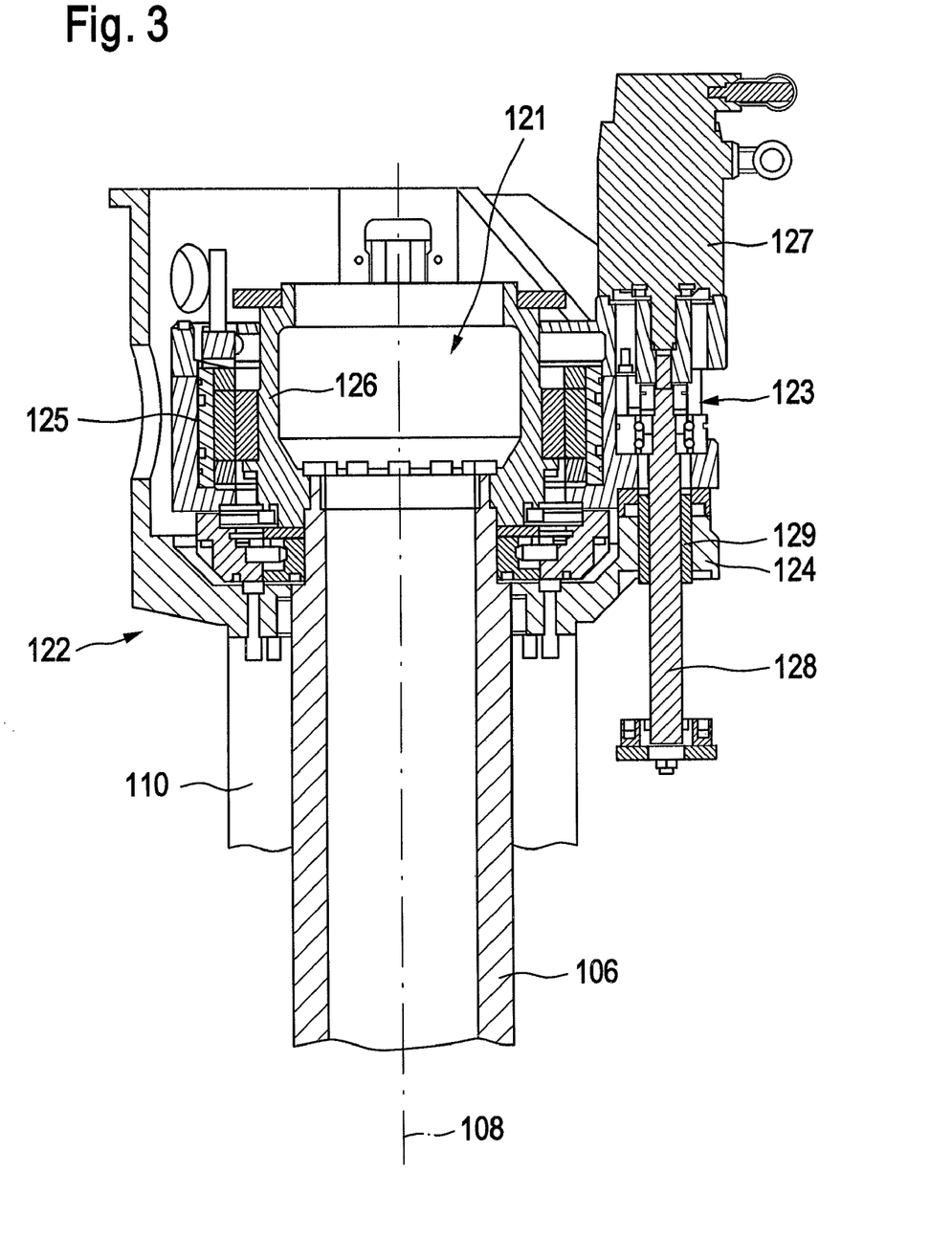
FIG. 3 shows an enlarged representation of a drive unit of a tool carrier unit according to the invention.

Provided for the movements in the Y direction and the rotation about the B axis is a drive unit, which is represented in FIG. 2 and FIG. 3, is designated as a whole by 122 and the housing 124 of which is fixed on the longitudinal and rotary guide 110, and which is disposed on a side of the machine bed 18 that is opposite from the tool carrier head 104.

Here, a rotary drive 121 and a linear drive 123 are provided in the housing 124.

The rotary drive 121 comprises a stator 125 of the rotary drive 121, in particular a torque motor, which is disposed in the housing such that it is displaceable in a direction parallel to the longitudinal axis 108, but rotationally fixed, while a rotor 126 of the rotary drive is disposed directly on one end of the guiding arm 106, so that, by means of the rotary drive 121, the guiding arm 106 is rotatable in relation to the housing 124, and consequently in relation to the rotary/longitudinal guide 110, about a longitudinal axis 108, and consequently about the B axis.

Furthermore, the stator 125 is connected to the rotor 126 so as to be axially non-displaceable, but rotatable, so that an axial displacement of the stator 125 in the direction of the longitudinal axis 108 brings about an advancing movement of the guiding arm 106, and consequently of the tool carrier head 104, in the direction of the longitudinal axis 108, and consequently in the Y direction of the machine tool.

For linear displacement of the stator 125 in relation to the housing 124, the linear drive 123 is provided with a drive motor 127, which is seated on the stator 126, and a spindle 128, the spindle nut 129 of which is fixedly seated in the housing 124, so that turning of the spindle 128 displaces the stator 125 in relation to the housing 124 in the direction of the longitudinal axis 108.

In the case of the first exemplary embodiment, represented in FIG. 1, a second tool carrier unit 150 is also disposed in a stationary manner on a transverse side 186 of the second column 22, and is consequently not displaceable.

Consequently, to machine workpieces W2 that are held in the second workpiece spindle unit 70, it is necessary to produce the movement in the X direction by moving the second workpiece spindle unit 70 in the X direction, to be precise by displacing the base body 62 on the slide guides 82, 84.

Otherwise, the tool carrier 154 is movable in relation to the tool carrier base 152 in the same way as described in connection with the second exemplary embodiment.

In the case of the first exemplary embodiment, only the first tool carrier unit 100 is disposed movably in the X direction in the opening 32 between the columns 20, 22.

Furthermore, the second tool carrier unit 150 is disposed in an opening 182, provided specifically for this purpose, between the columns 20, 22, the openings 182, 32 being separated from one another by a cross bracing 184, which additionally contributes to improving the stiffness of the machine bed 18.

In the case of this exemplary embodiment, the tool carrier base 152 likewise comprises the longitudinal and rotary guide 110 and is in this respect formed identically to the tool carrier unit 100, the tool carrier base 152 for its part however being held in a stationary manner directly by a further transverse side 186 of the second column 22 that is adjacent the opening 182.

Figure 4:
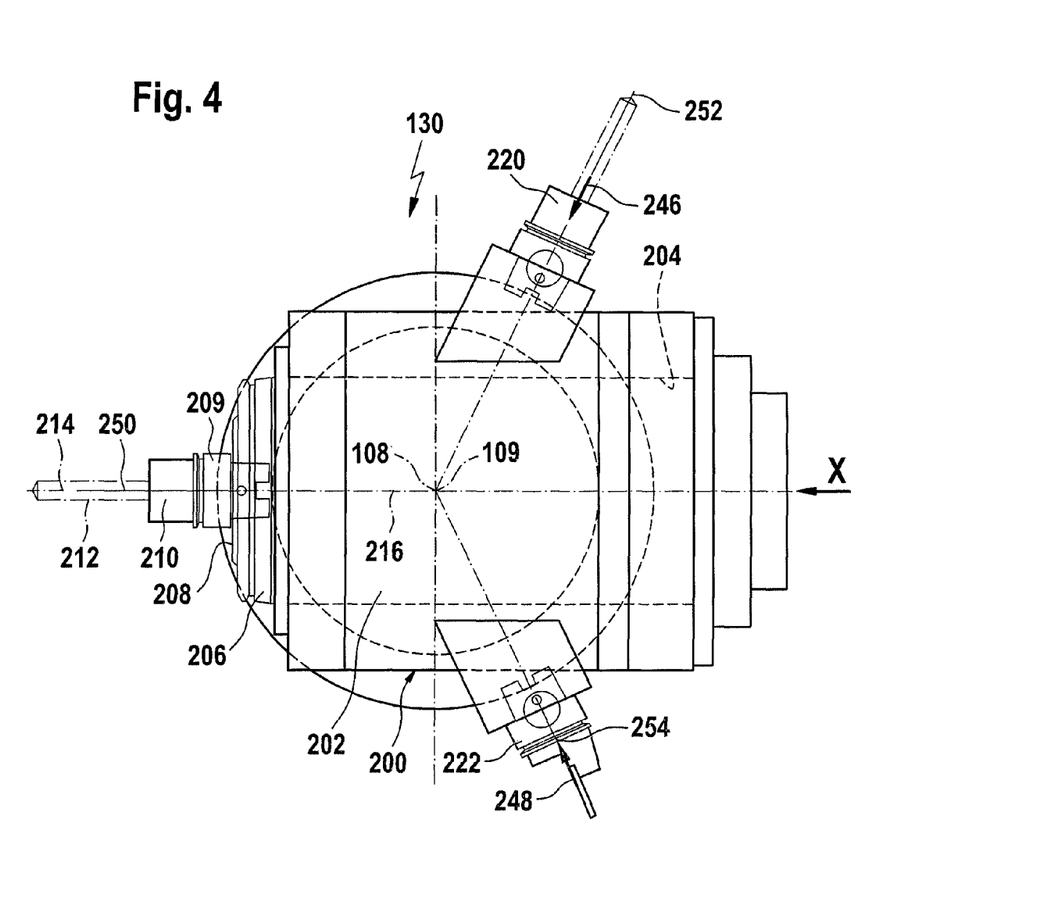
FIG. 4 shows an enlarged representation of a tool carrier head in the case of the first exemplary embodiment.
Figure 5:
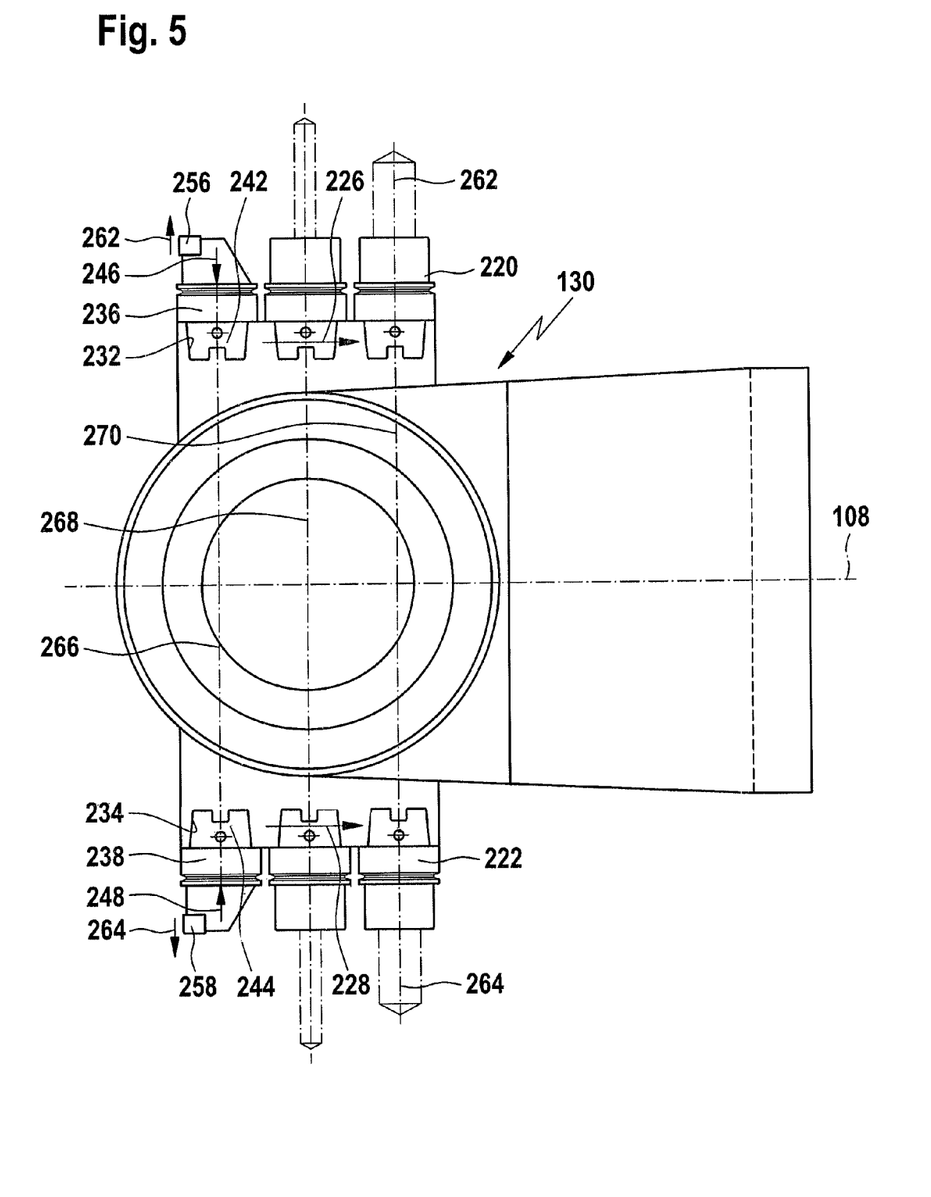
FIG. 5 shows a view in the direction of the arrow X in FIG. 4.

In the case of this first exemplary embodiment, the tool carrier head 104 is formed as a multiple tool carrier head 130 and comprises a tool spindle 200, as additionally represented in FIGS. 4 and 5, which has a tool spindle housing 202, in which there is mounted a spindle motor 204, which drives a spindle shaft 206, into which a tool holder 210 can be inserted into a tool holder receiving means 209 in the region of a front end 208. Consequently, a drivable tool 212 is seated in the spindle shaft 206, a tool axis 214 running coaxially in relation to a tool spindle axis 216, which represents the axis of rotation of the spindle shaft 206.

The tool spindle 200 has, for example, a power output of at least 8 kW and reaches rotational speeds greater than 10,000 rpm.

When the tool is being rotationally driven, the tool axis 214 corresponds to the tool direction, defined in the case of the rotationally driven tool by the axis of advance and/or the feed axis in the machining of the workpiece, and lies here in a tool plane 250, which runs through the longitudinal axis 108.

As likewise represented in FIGS. 4 and 5, disposed as supplementary tool carriers on the tool spindle housing 202, to be precise on opposite sides of the longitudinal axis 108, are linear tool carriers 220, 222, which respectively have tool holder receiving means 232, 234 which are disposed one after the other in the direction of a row 226, 228 and into which tool holders 236, 238 can be inserted.

The tool holders 236, 238 are all formed such that each insert 242, 244 that can be inserted into the tool holder receiving means 232, 234 of the linear tool carriers 220, 222 can be inserted in a direction of insertion 246, 248, which, as represented in particular in FIG. 4, lie in further tool planes 252, 254, which also run through the longitudinal axis 108, so that the tool planes 250, 252, 254 intersect in the longitudinal axis 108 as a common straight line 109.

Furthermore, the directions of the rows 226, 228 of tool holder receiving means 232, 234 also run parallel to the tool planes 252, 254.

All the tool holders 236, 238 are loaded with tools 256 or 258, which have at least one tool direction 262, 264, which runs parallel to the respective tool plane 252, 254 and is defined by the advance and/or feed direction of the tools 256, 258 in the machining of a workpiece W, the tool directions 262, 264 preferably lying in the tool planes 252, 254.

Furthermore, the tool directions 262, 264 extend transversely, in particular perpendicularly, to the directions of the rows 226, 228.

The tool planes 252, 254 are preferably not perpendicular to the tool spindle axis 216 and the tool plane 250, but respectively form therewith an included angle of approximately 120°, so that, with respect to the longitudinal axis 108, an angle of 120° exists between the tool plane 250 and the tool plane 252 as well as between the tool plane 250 and the tool plane 254, and, on a side facing away from the tool 212, the tool planes 252, 254 likewise form with one another an included angle of approximately 120°.

Furthermore, the tools disposed one after the other in the respective direction of the row 226, 228 can be brought into use by displacing the tool spindle 200 in the direction of the longitudinal axis 108.

Furthermore, as represented in FIG. 5, the tools 256, 258 respectively disposed on opposite sides of the longitudinal axis 108 lie in alignment planes 266, 268, 270 running perpendicularly to the longitudinal axis 108, so that, depending on the position of the tool spindle 200, the tools 256, 258 that lie in one of the alignment planes 266, 268, 270 can be brought into use on the workpiece, a change of tool being possible just by turning the entire workpiece spindle 200 about the longitudinal axis 108.

Furthermore, the alignment plane 268 is preferably disposed such that not only the directions of advance 262, 264 of the tools 256, 258 of the linear tool carriers 220, 222 lie in it, but so too does the tool axis 214 of the tool 212.

Figure 6:
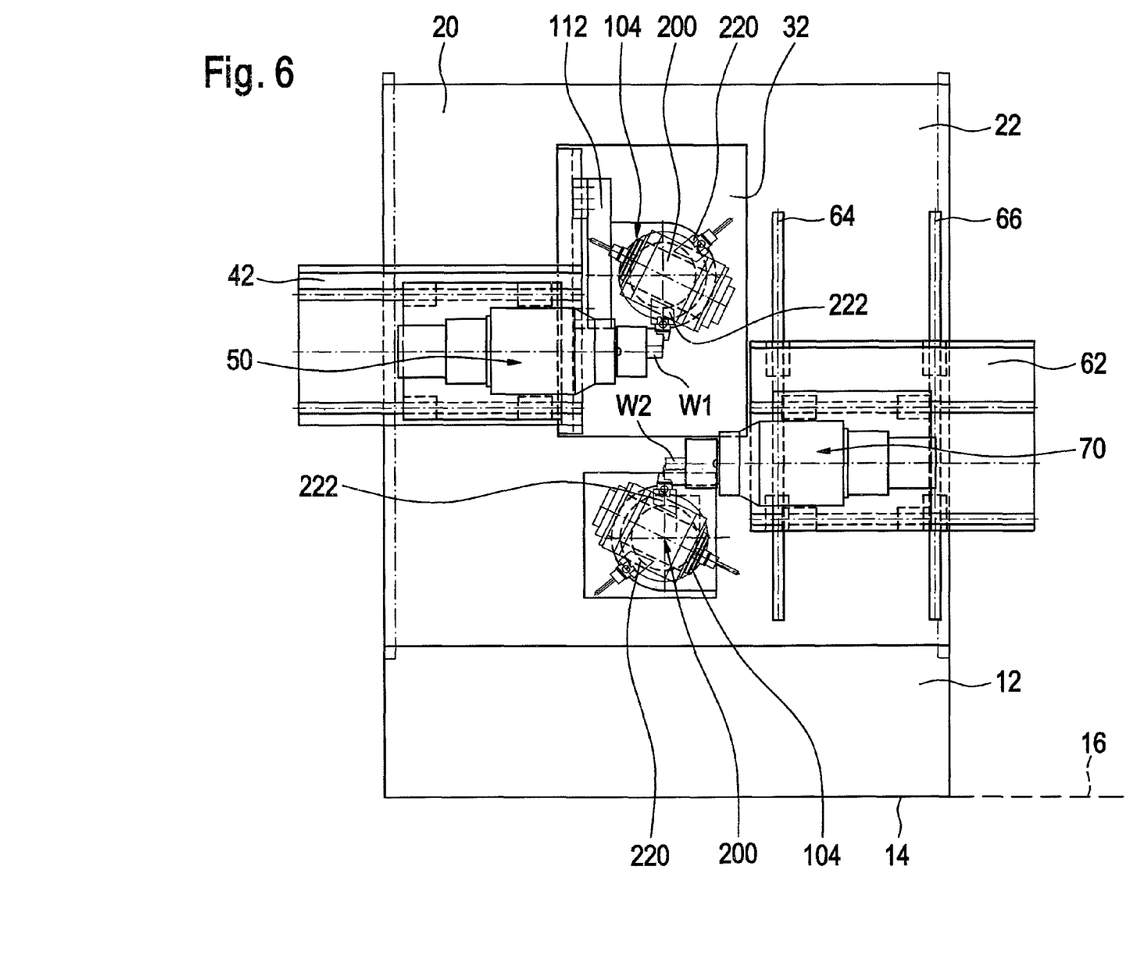
FIG. 6 shows a representation similar to FIG. 1 of one possibility for using tools from a supplementary tool carrier.
Figure 7:
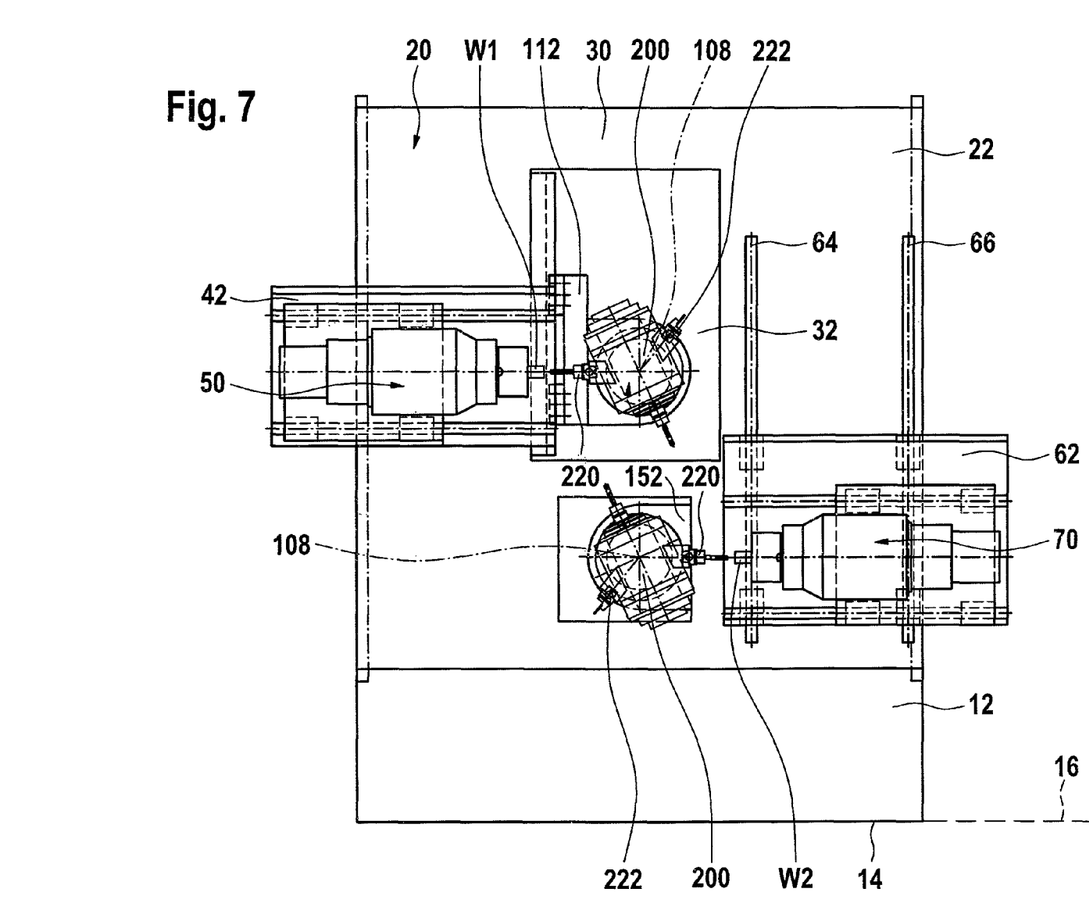
FIG. 7 shows a representation similar to FIG. 1 of a second possibility for using tools from a supplementary tool carrier.

The changing use of the different tools 212, 256, 258 with their directions of advance 214, 262, 264 perpendicular or parallel to the respective workpiece spindle axis 56, 76 is represented in FIGS. 6 and 7, the advantage of this solution being that the tools that are not in use on the workpiece are at such an angular distance from one another, with respect to the longitudinal axis 108, that they do not hinder the machining of the workpiece in the respective workpiece spindle unit 50, 70.

Disposing all the tools 212, 256, 258 with their directions of advance 214, 262, 264 in the tool planes 250, 252, 254, which all intersect in the straight line 109, has the effect that the forces occurring during the use of such a tool 212, 256, 258 all act radially in relation to the straight line 109 and are consequently also introduced radially into the tool carrier head 104.

If the straight line 109 also coincides with the longitudinal axis 108, there is substantially no torsional loading of the guiding arm 106 during the use of these tools.

Figure 8:
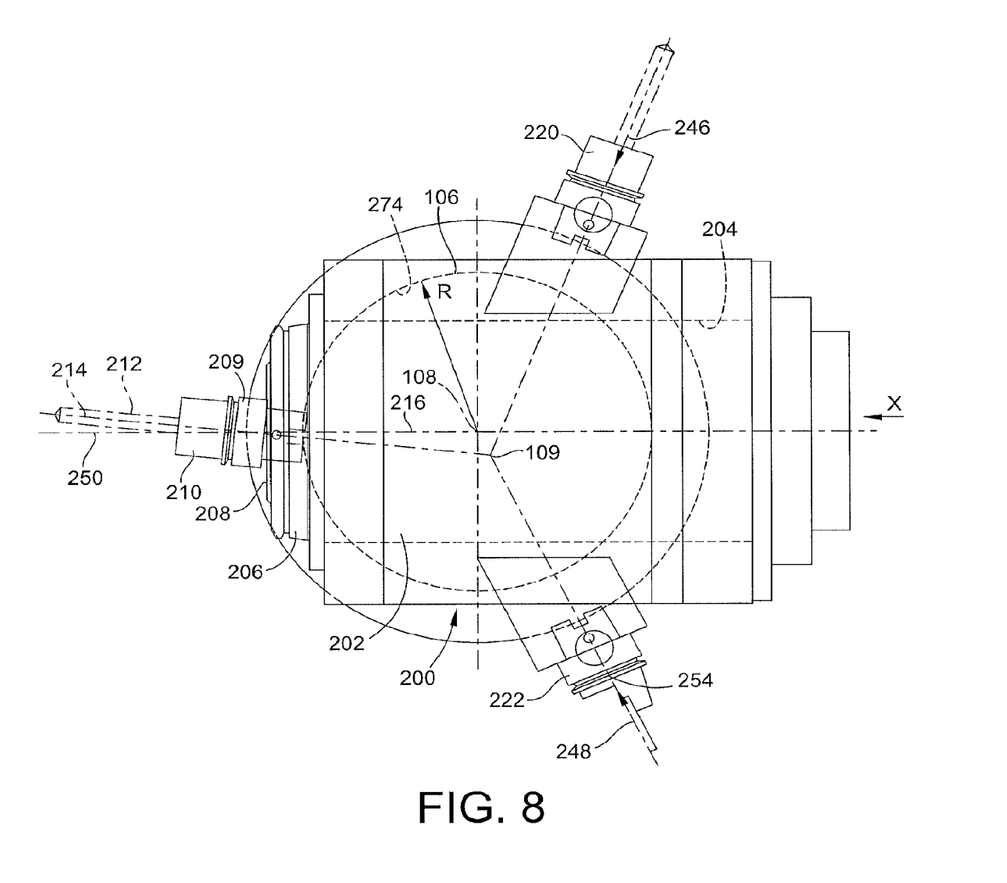
FIG. 8 shows a representation similar to FIG. 4 to explain variants of the first exemplary embodiment.

As a departure from the situation in the case of the first exemplary embodiment, however, there is also the possibility, as represented in FIG. 8, of providing the straight line 109 within a geometric cylindrical space 274, which extends around the longitudinal axis 108 as a cylinder axis with a radius R, which corresponds at most to an average outer radius of the guiding arm 106, preferably is less than that, and has for example a radius R that corresponds approximately to half the average radius of the guiding arm 106, still better approximately 0.2 of the radius of the guiding arm 106.

As long as the straight line 109 lies within a cylindrical space 274 of such dimensions around the longitudinal axis 108 as a cylinder axis, the forces occurring during machining with the tools 214, 256, 258 disposed in the tool planes 250, 252, 254, and the resultant torques, are so small that they can be accepted without any problem by the rotary drive 121 or a braking or blocking device associated with the latter.

This structural design measure has the effect of considerably improving the precision of the machine tool, since the tool carrier unit 100 is capable on the basis of its structural design of accepting these forces optimally and with the least possible deformation.

Figure 9:
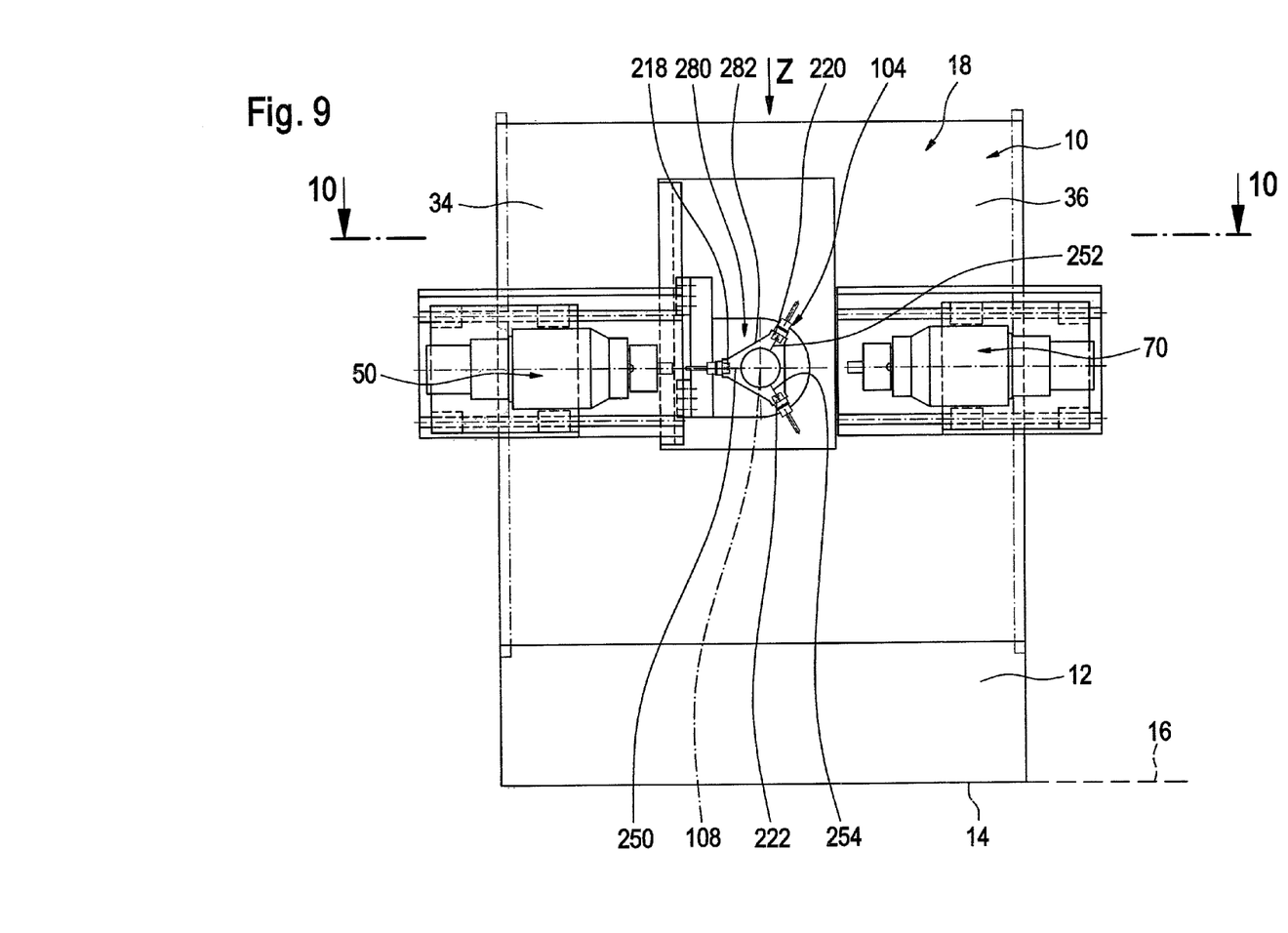
FIG. 9 shows a schematic view of a second exemplary embodiment of a machine tool according to the invention and FIG. 10 shows a section along line 10-10 in FIG. 9.
Figure 10:
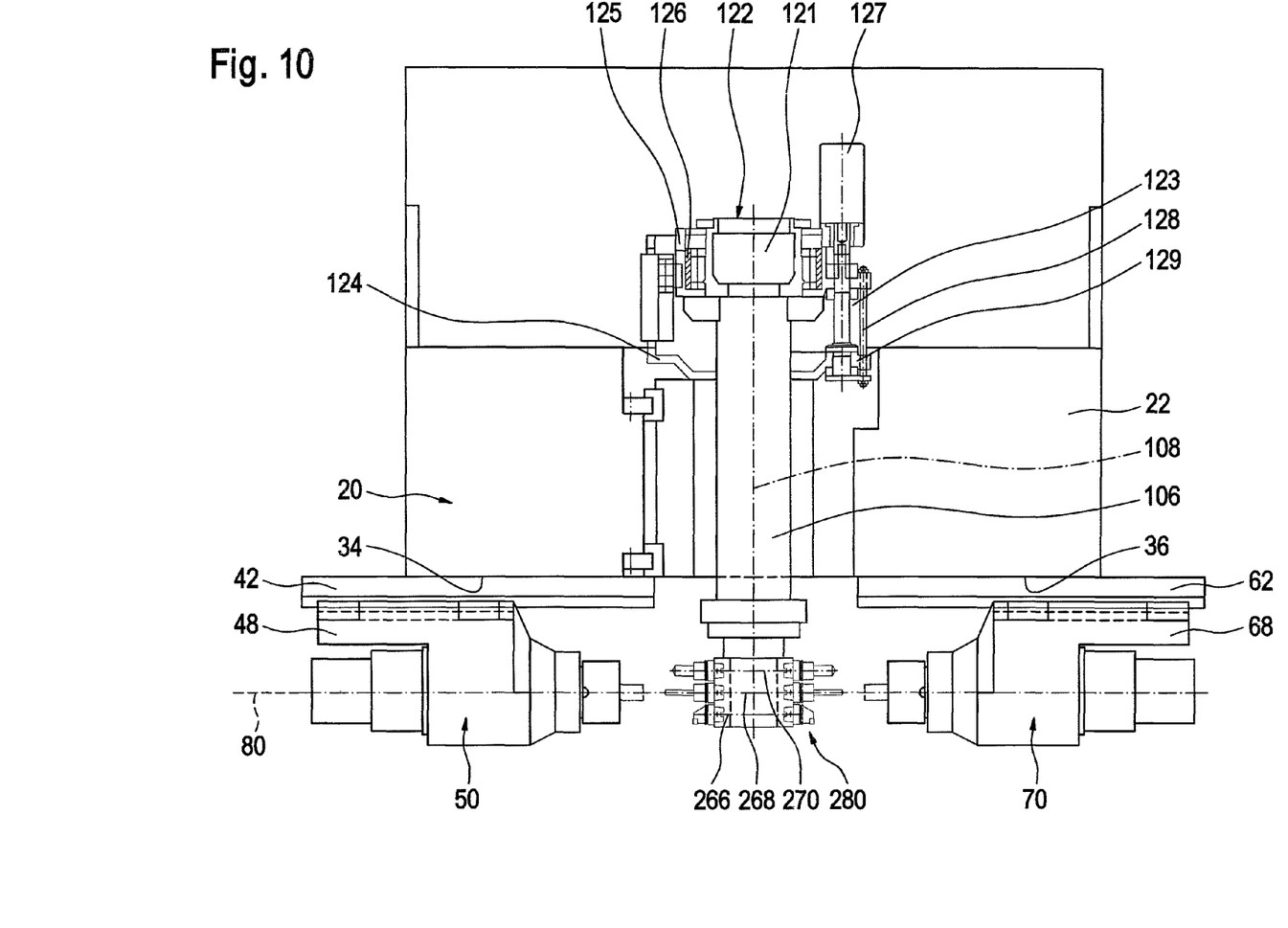

In the case of a second exemplary embodiment, represented in FIGS. 9 and 10, those elements that are identical to those of the previous exemplary embodiments are likewise provided with the same reference numerals, so that, with regard to the same, reference can be made to the statements made with respect to the previous exemplary embodiment in their entirety.

In the case of the second exemplary embodiment, the tool carrier head 104 is formed as a multiple tool carrier head 280, in particular as a multiple linear tool carrier, such that, in a way similar to the case of the first exemplary embodiment, it has three tool planes 250, 252, 254, which all form between them an included angle of 120°, and in which tools are respectively disposed one after the other in the direction of the corresponding row, the tools also in this case lying in successive alignment planes 266, 268, 270.

By contrast with the first exemplary embodiment, however, all the tools are, for example, non-driven tools. They are merely used as stationary tools in connection with one of the workpiece spindle units 50, 70.

A change of the respective tool is possible in a simple manner, by a base 282 of the multiple linear tool carrier 280, carrying all the tool holder receiving means, being rotatable about the longitudinal axis 108 and displaceable in the direction of the longitudinal axis 108.

The invention claimed is:

1. Machine tool comprising
a machine frame,
a first workpiece carrier unit, which is disposed on the machine frame and has a workpiece receiving means,
at least one tool carrier unit, which is disposed on the machine frame, the at least one tool carrier unit having a tool carrier base and a tool carrier head, which is movable in relation to the tool carrier base along an axis of advance by means of a guiding arm and is rotatable about an axis of rotation parallel to, or coincident with, the axis of advance by means of the guiding arm,
the tool carrier head is formed as a multiple tool carrier and comprises
a tool spindle which is provided with a spindle motor with a spindle shaft and a rotatably driveable tool for machining a workpiece held in the workpiece receiving means, said rotatably driveable tool is seated in said spindle shaft,
the tool carrier head has at least two tool planes, such that, in each tool plane, at least one tool extends with a longitudinal direction thereof in at least one respective tool direction along the respective tool plane, the at least two tool planes run parallel to, or coincident with, the axis of rotation, the at least two tool planes of the tool carrier head run through a common straight line, the common straight line lies within a geometric cylindrical space around the axis of rotation, which has a maximum radius corresponding to no more than an average radius of the guiding arm, and a working space, in which a workpiece held in the workpiece receiving means can be machined with the at least one rotatably driveable tool, and
the tool carrier head is fixedly connected to the guiding arm.

2. Machine tool according to claim 1, wherein the at least two tool planes run parallel to the axis of rotation.

3. Machine tool according to claim 1, wherein all tool planes of the tool carrier head run through the common straight line.

4. Machine tool according to claim 1, wherein the cylindrical space has a radius corresponding to no more than approximately 0.5 of the average radius of the guiding arm.

5. Machine tool according to claim 4, wherein the cylindrical space has a radius corresponding to no more than approximately 0.2 of the average radius of the guiding arm.

6. Machine tool according to claim 1, wherein the common straight line coincides with the axis of rotation.

7. Machine tool according to claim 1, further comprising a plurality of tools that extend in directions of advance that are in at least one of the at least two tool planes.

8. Machine tool according to claim 7, wherein, in one of the at least two tool planes, the plurality of tools is disposed so as to extend in the one of the at least two tool planes with their direction of advance.

9. Machine tool according to claim 7, wherein the plurality of tools that extend in the direction of advance in the one of the at least two tool planes are disposed in a linear tool carrier of the tool carrier head.

10. Machine tool according to claim 9, wherein the linear tool carrier has tool receiving means lined up in the direction of a row that is parallel to the direction of advance of the tool carrier head relative to the tool carrier base.

11. Machine tool according to claim 1, wherein the rotatably driveable tool extends in its respective tool direction in one of the tool planes, and is disposed in the tool spindle, and extends along the respective longitudinal tool axis in one of the at least two tool planes.

12. Machine tool according to claim 11, wherein the tool axis of the rotatably driveable tool is aligned transversely to the axis of rotation.

13. Machine tool according to claim 12, wherein the tool axis of the rotatably drivable tool runs perpendicularly to the axis of rotation.

14. Machine tool according to claim 1, wherein successive ones of the tool planes form an included angle which is greater than 90° and less than 180°.

15. Machine tool according to claim 14, wherein the angle is greater than 100° and less than 170°.

16. Machine tool according to claim 15, wherein the angle is greater than 110° and less than 160°.

17. Machine tool according to claim 1, wherein the tool carrier head further comprises a supplementary tool carrier.

18. Machine tool according to claim 17, wherein the tool spindle has a tool spindle housing, and wherein the supplementary tool carrier is disposed on the tool spindle housing on at least one side of tool spindle axis.

19. Machine tool according to claim 17, wherein the supplementary tool carrier is formed as a multiple tool carrier.

20. Machine tool according to claim 19, wherein the multiple tool carrier is formed as linear tool carrier.

21. Machine tool according to claim 20, wherein the tool spindle has a tool spindle housing, and wherein the linear tool carrier has tool receiving means disposed in the direction of a row parallel to a direction of advance of the tool spindle housing.

22. Machine tool according to claim 21, wherein all of the tool receiving means of the linear tool carrier lie in one tool plane.

23. Machine tool according to claim 17, wherein the tool spindle has a tool spindle housing, and wherein the tool spindle housing is fixedly connected to a front end of the guiding arm.

24. Machine tool according to claim 17, wherein the tool spindle has a tool spindle axis aligned transversely to the axis of rotation.

25. Machine tool according to claim 17, wherein the tool spindle has a tool spindle axis aligned transversely to the axis of advance.

26. Machine tool according to claim 17, wherein the tool spindle has a tool spindle housing, and wherein the spindle shaft is mounted in the tool spindle housing and carries a tool receiving means at one end.

27. Machine tool according to claim 26, wherein the tool receiving means is disposed on one side of the axis of rotation.

28. Machine tool according to claim 1, wherein the tool spindle has a tool spindle housing, and wherein the tool spindle housing carries a supplementary tool carrier on more than one side of the tool spindle housing.

29. Machine tool according to claim 28, wherein the tool spindle housing carries the supplementary tool carriers on mutually opposite sides of the tool spindle housing.

30. Machine tool according to claim 29, wherein the supplementary tool carriers are disposed on opposite sides of the axis of rotation.

31. Machine tool according to claim 1, wherein the tool carrier head is formed as a multiple linear tool carrier which comprises linear tool carriers that are disposed in a star shape around the axis of rotation and have tool receiving means disposed in the direction of a row parallel to a direction of advance (Y) of the multiple linear tool carrier.

32. Machine tool according to claim 31, wherein all of the tool receiving means of each respective one of the linear tool carriers lie in one respective tool plane.

33. Machine tool according to claim 1, wherein a drive unit is provided on the tool carrier base for the movement of the guiding arm relative to the tool carrier base.

34. Machine tool according to claim 33, wherein the drive unit comprises a rotary drive having a rotor and a stator, the rotor of which is connected to the guiding arm and the stator of which is rotationally fixed in a housing of the drive unit.

35. Machine tool according to claim 34, wherein the stator of the rotary drive is displaceable in relation to the housing of the drive unit by means of a linear drive.

36. Machine tool according to claim 34, wherein the housing of the drive unit is fixedly connected to the tool carrier base.

37. Machine tool according to claim 36, wherein the tool carrier base has a longitudinal and rotary guide for the guiding arm.

38. Machine tool according to claim 37, wherein the housing of the drive unit is connected to the longitudinal and rotary guide.

* * * * *